(12) United States Patent
Peterson et al.

(10) Patent No.: US 11,557,221 B2
(45) Date of Patent: Jan. 17, 2023

(54) INTELLIGENT CABLING AND CONNECTION INSTRUCTION REFINEMENT

(71) Applicant: International Business Machines Corporation, Armonk, NY (US)

(72) Inventors: Beth Ann Peterson, Tucson, AZ (US); Paulina Acevedo, Tucson, AZ (US); Veronica A. Reeves-Voeltner, Tucson, AZ (US); Samantha A. Utter, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 400 days.

(21) Appl. No.: 16/837,344

(22) Filed: Apr. 1, 2020

(65) Prior Publication Data

US 2021/0312829 A1 Oct. 7, 2021

(51) Int. Cl.
*G09B 19/00* (2006.01)
*G09B 5/00* (2006.01)
*G09B 5/02* (2006.01)
*G06F 16/245* (2019.01)

(52) U.S. Cl.
CPC ......... *G09B 19/003* (2013.01); *G06F 16/245* (2019.01); *G09B 5/02* (2013.01)

(58) Field of Classification Search
CPC .............................. G09B 19/00; G09B 19/003
See application file for complete search history.

(56) References Cited

U.S. PATENT DOCUMENTS

| | | | |
|---|---|---|---|
| 7,817,583 B2 | 10/2010 | Graves | |
| 9,037,686 B2 | 5/2015 | Kugel | |
| 9,235,824 B2 * | 1/2016 | Martin | G06Q 10/087 |
| 9,684,706 B2 | 6/2017 | Satzke et al. | |
| 9,929,516 B1 * | 3/2018 | Sasagawa | H01R 13/641 |
| 10,187,433 B2 | 1/2019 | Maistri et al. | |
| 10,454,210 B1 * | 10/2019 | Werner | G06T 19/006 |

(Continued)

OTHER PUBLICATIONS

Rasthofer et al.; "A Machine-Learing Approach for Classifying and Categorizing Android Sources and Sinks", NDSS'14 Symposium On, pp. 1-15, Feb. 23-26, 2014.

(Continued)

*Primary Examiner* — Milap Shah
(74) *Attorney, Agent, or Firm* — Nelson IP; Daniel P. Nelson

(57) ABSTRACT

A method is disclosed to ensure that components in a complex system are correctly connected together. In one embodiment, such a method provides a library of previous configurations of a system. The system includes multiple components connected together with cables. The method generates, from the library, instructions for assembling the system by connecting components of the system together with cables. The method receives feedback generated in the course of using the instructions to assemble the system and uses the feedback to refine the instructions. In certain embodiments, a configuration associated with the assembled system is then added to the library. This process may be repeated to further refine the instructions and increase a number of configurations in the library. A corresponding apparatus and computer program product are also disclosed.

20 Claims, 10 Drawing Sheets

(56) References Cited

U.S. PATENT DOCUMENTS

| | | | |
|---|---|---|---|
| 10,466,963 | B2 | 11/2019 | Levi et al. |
| 10,469,341 | B2 | 11/2019 | Gandhi |
| 10,481,950 | B2 | 11/2019 | Le Saux et al. |
| 10,482,260 | B1 | 11/2019 | Bettini et al. |
| 2002/0147027 | A1 | 10/2002 | Alford, Jr. et al. |
| 2006/0156294 | A1* | 7/2006 | Fuller ................. G06F 8/34 717/154 |
| 2006/0168182 | A1* | 7/2006 | Fuller ................. H04L 67/12 717/123 |
| 2006/0277324 | A1* | 12/2006 | Aldereguia ......... G06F 13/4072 710/1 |
| 2007/0247284 | A1* | 10/2007 | Martin ............... G06K 7/10316 340/572.8 |
| 2008/0259816 | A1* | 10/2008 | Archer ................. G06F 30/18 370/254 |
| 2009/0125861 | A1* | 5/2009 | Orita ................... G06F 30/394 716/137 |
| 2011/0012727 | A1* | 1/2011 | Pance ................. G06F 13/4068 340/505 |
| 2011/0279266 | A1* | 11/2011 | Nolterieke ......... H04L 41/0873 710/16 |
| 2013/0223684 | A1* | 8/2013 | Townend ............. G06F 3/0484 382/103 |
| 2014/0108000 | A1 | 4/2014 | Datla et al. |
| 2016/0132532 | A1* | 5/2016 | German ................. G06V 20/20 340/687 |
| 2016/0299750 | A1 | 10/2016 | Koniges et al. |
| 2017/0018274 | A1* | 1/2017 | German ................. G10L 15/22 |
| 2017/0024378 | A1 | 1/2017 | Sharma et al. |
| 2017/0117669 | A1* | 4/2017 | Brodsky ............. G06F 11/2289 |
| 2018/0006894 | A1* | 1/2018 | Power ................... H04L 41/12 |
| 2018/0121576 | A1 | 5/2018 | Mosher et al. |
| 2018/0247123 | A1* | 8/2018 | Harper ............... H04N 21/4425 |
| 2018/0317068 | A1 | 11/2018 | Ward et al. |
| 2019/0086988 | A1 | 3/2019 | He et al. |
| 2019/0200244 | A1 | 6/2019 | Polepalli |
| 2019/0215664 | A1 | 7/2019 | Smyth et al. |
| 2021/0065343 | A1* | 3/2021 | Acevedo ............. H05K 7/1449 |
| 2021/0065348 | A1* | 3/2021 | Acevedo ................ G06V 10/10 |
| 2022/0173967 | A1* | 6/2022 | Ameling ............. H04L 41/0889 |

OTHER PUBLICATIONS

Yuan et al.; "A Machine Learning Based Approach to Mobile Network Analysis", ICCCN 27th IEEE International Conference On, pp. 1-9, Jul. 30-Aug. 2, 2018.

Sousa et al.; "Real-Time Architecture for Mobile Assistant Robots", EFTA 12th IEEE Conference On, pp. 1-8, Sep. 25-28, 2007.

Wang et al.; "A First Look at Mobile Intelligence: Architecture, Experimentation and Challenges", Cornell University Library, arXiv:1807.08829v1, pp. 1-6, Jul. 12, 2018.

U.S. Appl. No. 16/550,343, filed Aug. 26, 2019.

* cited by examiner

INTELLIGENT CABLING AND CONNECTION INSTRUCTION REFINEMENT

BACKGROUND

Field of the Invention

This invention relates to apparatus and methods for intelligently refining instructions for cabling and connecting components.

Background of the Invention

In complex rack-mounted or other systems (e.g., storage arrays, audio-visual systems, mainframe servers, etc.) that include multiple discrete electronic components that are connected to one another, the components are often connected together using external cables. These cables may be connected to ports on the components to enable communication and/or power signals to pass therebetween. The cables represent a critical part of the system infrastructure. If cables are not installed properly, the complex system is unlikely to function as well as it could, and may not function at all. For this reason, cabling systems, such as structured cabling, have been developed to minimize mistakes that may impair the operation of a complex system.

With complex systems that include a large number of components, the number of cables may be significant. Furthermore, the large number of components in such systems increases the probability that components will fail and/or need to be replaced or serviced at some point in the future. When components in a complex system are connected together with cables at the time they are initially set up or when a component is replaced, there is a significant chance that the components will be connected together incorrectly. Incorrectly connected cables are typically not easily identified and may lead to a crisis or failure at some future point-in-time. Trying to diagnose and remedy incorrectly connected cables may consume a significant amount of time and resources and therefore result in significant costs.

In view of the foregoing, what are needed are apparatus and methods to ensure that components in a complex system are correctly connected together. Ideally, such apparatus and methods will significantly reduce human error when connecting components together. Further needed are apparatus and methods to provide accurate instructions for cabling a complex system, as well as apparatus and methods for refining such instructions.

SUMMARY

The invention has been developed in response to the present state of the art and, in particular, in response to the problems and needs in the art that have not yet been fully solved by currently available apparatus and methods. Accordingly, embodiments of the invention have been developed to ensure that components in a complex system are correctly connected together. The features and advantages of the invention will become more fully apparent from the following description and appended claims, or may be learned by practice of the invention as set forth hereinafter.

Consistent with the foregoing, a method is disclosed to ensure that components in a complex system are correctly connected together. In one embodiment, such a method provides a library of previous configurations of a system. The system includes multiple components connected together with cables. The method generates, from the library, instructions for assembling the system by connecting components of the system together with cables. The method receives feedback generated in the course of using the instructions to assemble the system and uses the feedback to refine the instructions. In certain embodiments, a configuration associated with the assembled system is then added to the library. This process may be repeated to further refine the instructions and increase a number of configurations in the library.

A corresponding apparatus and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
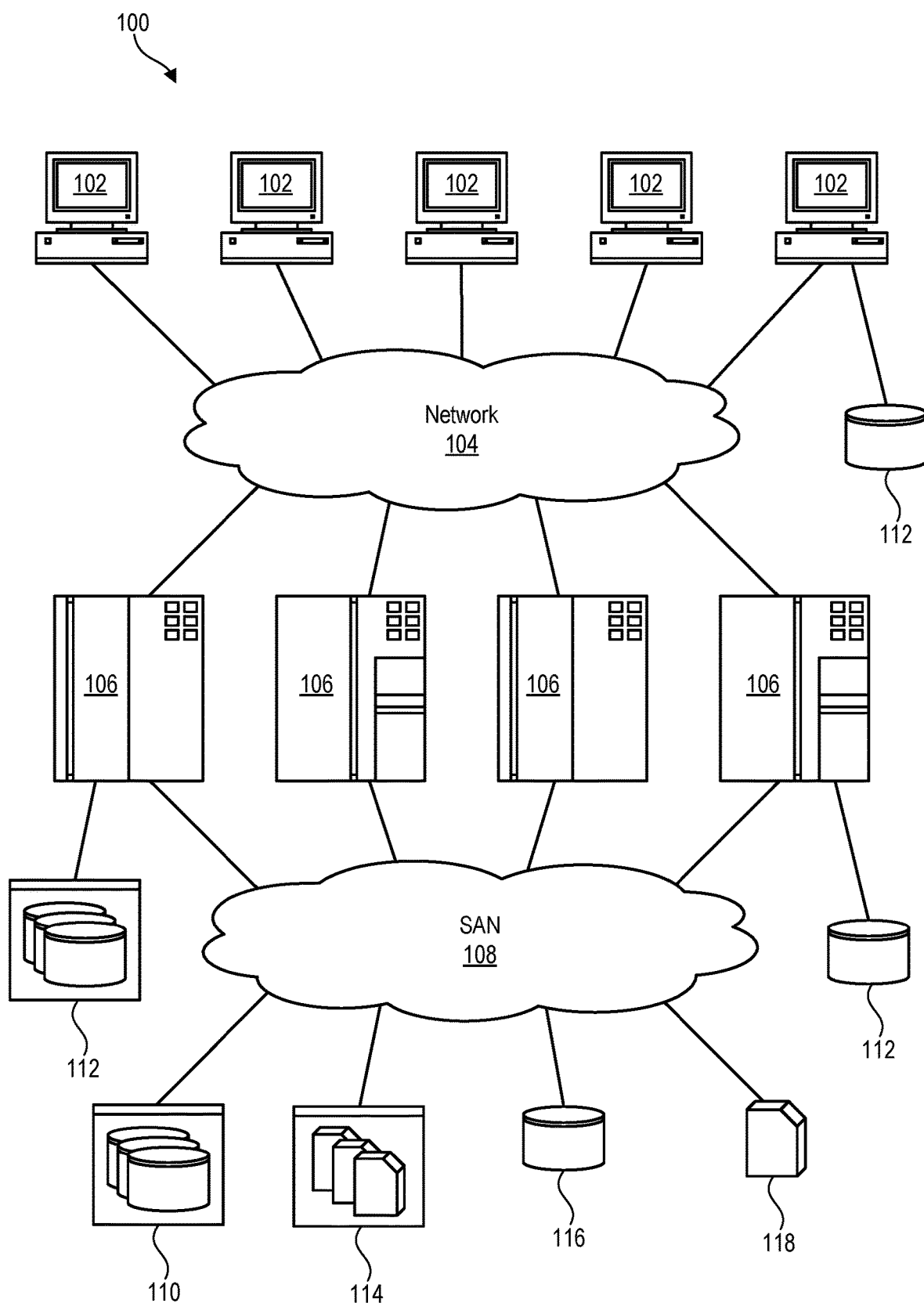
FIG. 1 is a high-level block diagram showing one example of a network environment in which apparatus and methods in accordance with the invention may be implemented.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The present invention may be embodied as a system, method, and/or computer program product. The computer program product may include a computer-readable storage medium (or media) having computer-readable program instructions thereon for causing a processor to carry out aspects of the present invention.

The computer-readable storage medium may be a tangible device that can retain and store instructions for use by an instruction execution device. The computer-readable storage medium may be, for example, but is not limited to, an electronic storage system, a magnetic storage system, an optical storage system, an electromagnetic storage system, a semiconductor storage system, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage system via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer-readable program instructions may execute entirely on a user's computer, partly on a user's computer, as a stand-alone software package, partly on a user's computer and partly on a remote computer, or entirely on a remote computer or server. In the latter scenario, a remote computer may be connected to a user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention may be described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus, or other device to produce a computer-implemented process, such that the instructions which execute on the computer, other programmable apparatus, or other device implement the functions/acts specified in the flowchart and/or block diagram block or blocks.

Referring to FIG. 1, one example of a network environment 100 is illustrated. The network environment 100 is presented to show one example of an environment where apparatus and methods in accordance with the invention may be utilized. The network environment 100 is presented by way of example and not limitation. Indeed, the apparatus and methods disclosed herein may be applicable to a wide variety of different network environments in addition to the network environment 100 shown.

As shown, the network environment 100 includes one or more computers 102, 106 interconnected by a network 104. The network 104 may include, for example, a local-area-network (LAN) 104, a wide-area-network (WAN) 104, the Internet 104, an intranet 104, or the like. In certain embodiments, the computers 102, 106 may include both client computers 102 and server computers 106 (also referred to herein as host systems 106). In general, the client computers 102 initiate communication sessions, whereas the server computers 106 wait for and respond to requests from the client computers 102. In certain embodiments, the computers 102 and/or servers 106 may connect to one or more internal or external direct-attached storage systems 112 (e.g., arrays of hard-storage drives, solid-state drives, tape drives, etc.). These computers 102, 106 and direct-attached storage systems 112 may communicate using protocols such as ATA, SATA, SCSI, SAS, Fibre Channel, or the like.

The network environment 100 may, in certain embodiments, include a storage network 108 behind the servers 106, such as a storage-area-network (SAN) 108 or a LAN 108 (e.g., when using network-attached storage). This network 108 may connect the servers 106 to one or more storage systems, such as arrays 110 of hard-disk drives or solid-state drives, tape libraries 114, individual hard-disk drives 116 or solid-state drives 116, tape drives 118, CD-ROM libraries, or the like. To access a storage system 110, 114, 116, 118, a host system 106 may communicate over physical connections from one or more ports on the host system 106 to one or more ports on the storage system 110, 114, 116, 118. A connection may be through a switch, fabric, direct connection, or the like. In certain embodiments, the servers 106 and storage systems 110, 114, 116, 118 may communicate using a networking standard or protocol such as Fibre Channel (FC) or iSCSI.

Figure 2:
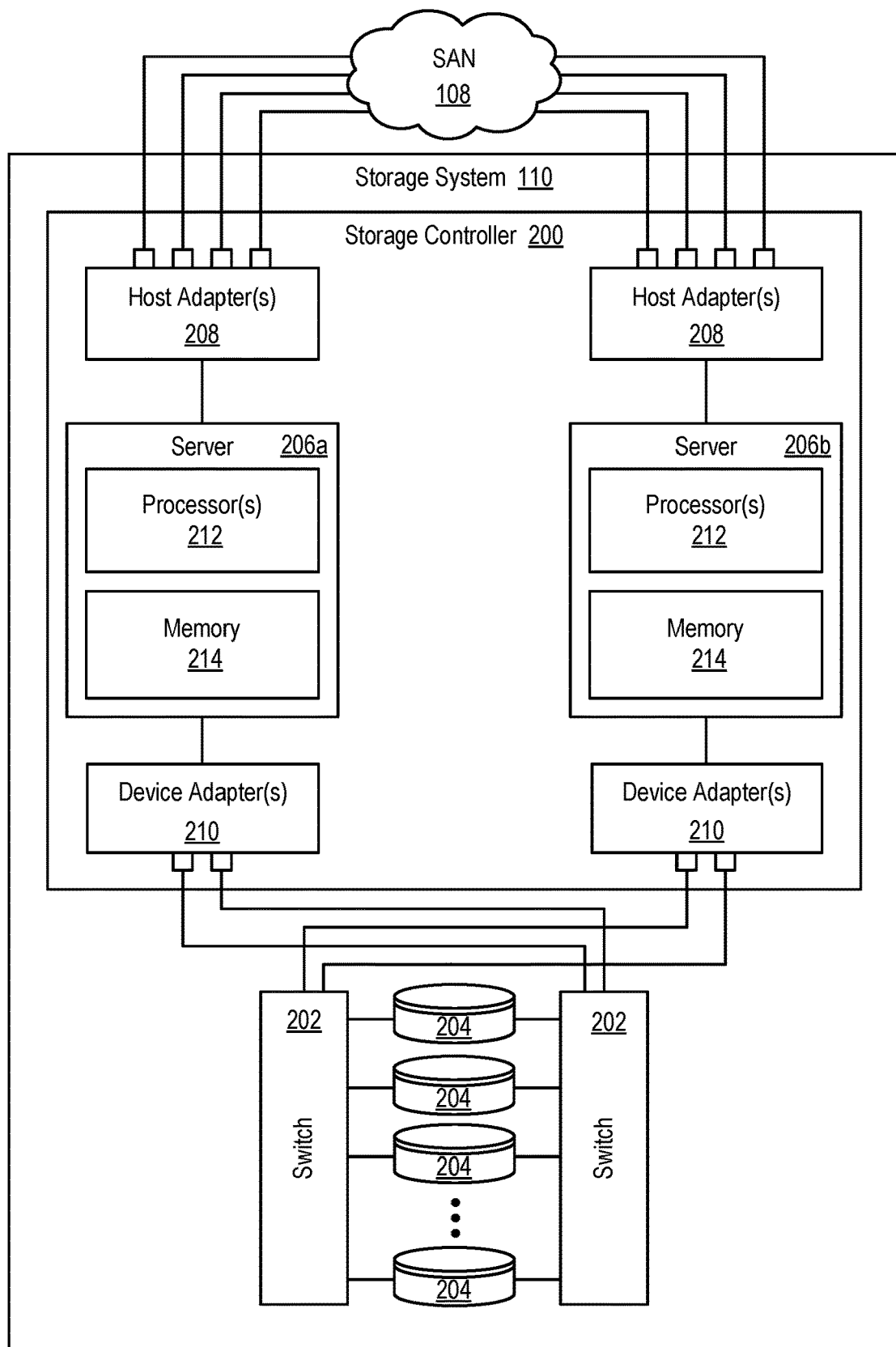
FIG. 2 is a high-level block diagram showing one embodiment of a storage system for use in the network environment of FIG. 1.

Referring to FIG. 2, one example of a storage system 110 containing an array of hard-disk drives 204 and/or solid-state drives 204 is illustrated. As shown, the storage system 110 includes a storage controller 200, one or more switches 202, and one or more storage drives 204, such as hard-disk drives 204 and/or solid-state drives 204 (e.g., flash-memory-based drives 204). The storage controller 200 may enable one or more host systems 106 (e.g., open system and/or mainframe servers 106 running operating systems such z/OS, zVM, or the like) to access data in the one or more storage drives 204.

In selected embodiments, the storage controller 200 includes one or more servers 206*a*, 206*b*. The storage controller 200 may also include host adapters 208 and device adapters 210 to connect the storage controller 200 to host devices 106 and storage drives 204, respectively. Multiple servers 206*a*, 206*b* may provide redundancy to ensure that data is always available to connected host systems 106. Thus, when one server 206*a* fails, the other server 206*b* may pick up the I/O load of the failed server 206*a* to ensure that I/O is able to continue between the host systems 106 and the storage drives 204. This process may be referred to as a "failover."

In selected embodiments, each server 206 may include one or more processors 212 and memory 214. The memory 214 may include volatile memory (e.g., RAM) as well as non-volatile memory (e.g., ROM, EPROM, EEPROM, hard disks, flash memory, etc.). The volatile and non-volatile memory may, in certain embodiments, store software modules that run on the processor(s) 212 and are used to access data in the storage drives 204. These software modules may manage all read and write requests to logical volumes in the storage drives 204.

One example of a storage system 110 having an architecture similar to that illustrated in FIG. 2 is the IBM DS8000™ enterprise storage system. The DS8000™ is a high-performance, high-capacity storage controller providing disk and solid-state storage that is designed to support continuous operations. Nevertheless, the techniques disclosed herein are not limited to the IBM DS8000™ enterprise storage system 110, but may be implemented in any comparable or analogous storage system 110, regardless of the manufacturer, product name, or components or component names associated with the system 110. Any storage system that could benefit from one or more embodiments of the invention is deemed to fall within the scope of the invention. Thus, the IBM DS8000™ is presented only by way of example and not limitation.

Figure 3:
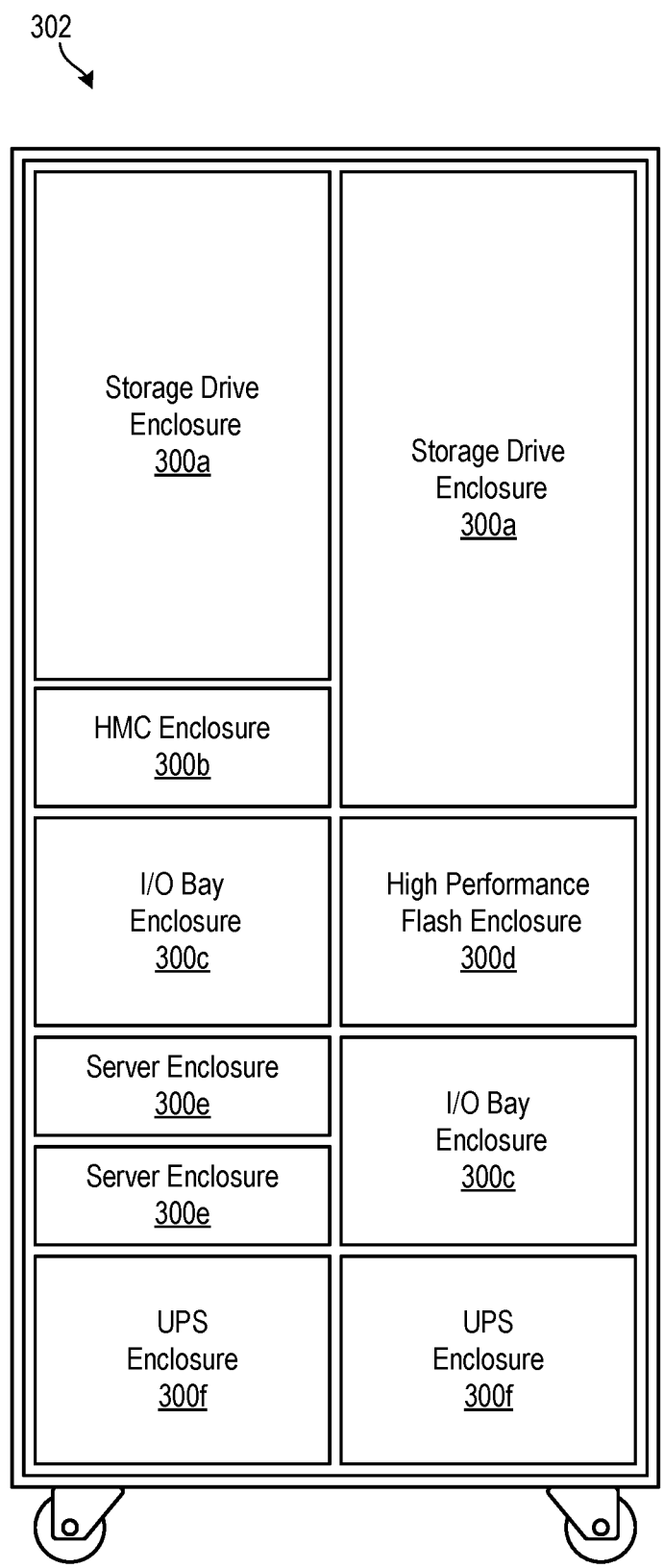
FIG. 3 is a high-level block diagram showing components of a storage system, such as the storage system illustrated in FIG. 2, contained within a rack.

Referring to FIG. 3, in certain embodiments, the components of a storage system 110, such as that illustrated in FIG. 2, may be contained in various enclosures 300 mounted, for example, within a rack 302. For example, the storage drives 204 may be contained within storage drive enclosures 300*a*, the host adapters 208 and/or device adapters 210 may be contained within I/O bay enclosures 300*c*, the servers 206*a*, 206*b* may be contained within server enclosures 300*e*, and so forth. In the illustrated embodiment, the rack 302 may also include an enclosure 300*b* that contains a hardware management console (HMC), enclosures 300*f* that contain uninterruptible power supplies (UPSs), and an enclosure 300*d* that contains high performance flash memory. These enclosures 300 are simply provided by way of example and not limitation. Other types of enclosures 300 are possible and within the scope of the invention.

In rack-mounted systems such as that illustrated in FIG. 3 that include multiple electronic components (e.g., host adapters 208, servers 206, device adapters, 210, switches 202, storage drives 204, etc.) that are connected to one another, the components may be connected together using external cables. These cables may be connected to ports on the components to enable communication and/or power signals to pass therebetween. The cables represent a critical part of the system infrastructure. If cables are not installed properly, the system is unlikely to function as well as it could, and may not function at all. For this reason, cabling systems, such as structured cabling, have been developed to minimize mistakes that may impair the operation of such a system.

Figure 4:
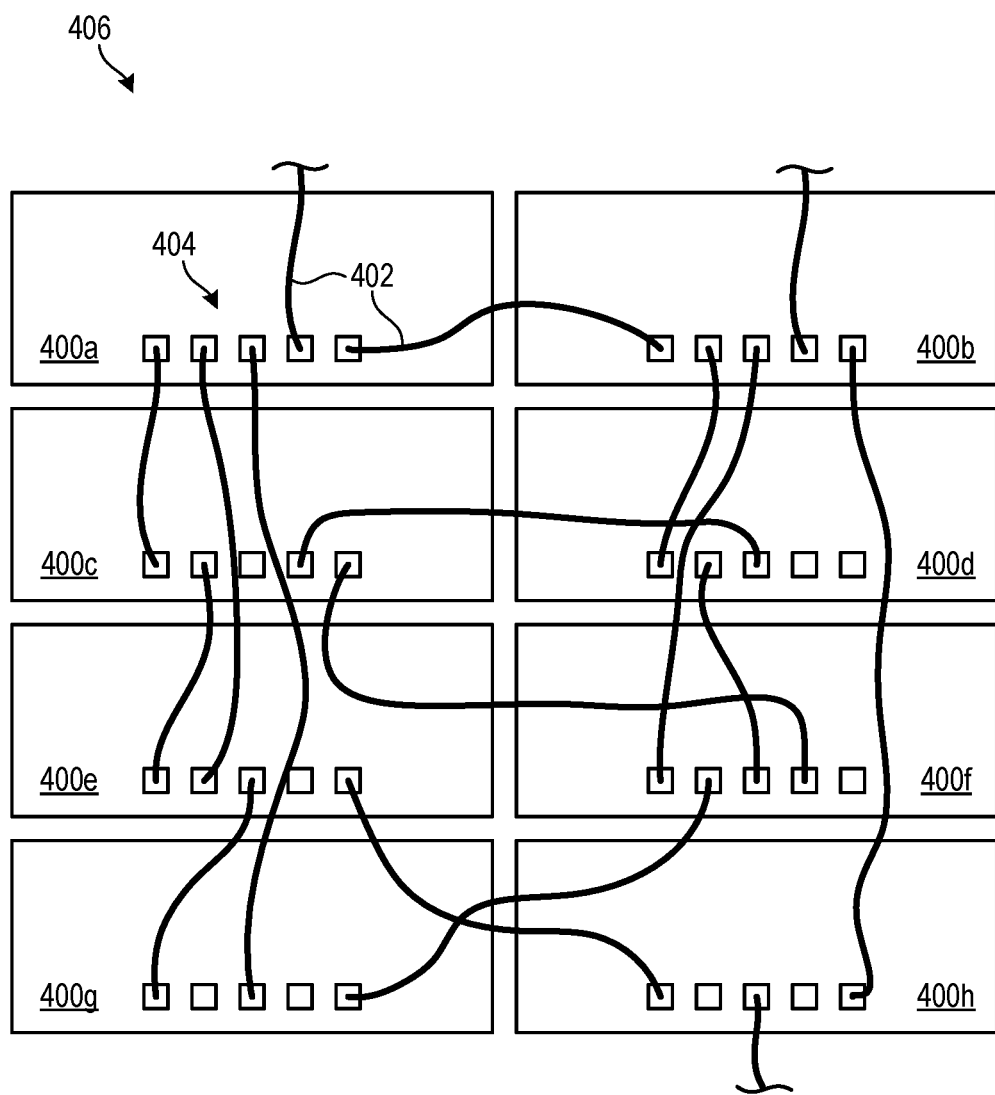
FIG. 4 is a high-level block diagram showing various components connected together using cables and ports.

Referring to FIG. 4, with complex systems 406 that include a large number of components 400, the number of cables 402 and ports 404 may be significant. FIG. 4 is a high-level block diagram showing an exemplary system 406 made up of various components 400 connected together using cables 402 and ports 404. The larger number of components 400 in such a system 406, the higher probability that components 400 will fail and/or need to be replaced or serviced at some time in the future. When components 400 in a complex system 406 are connected together with cables 402 at the time they are initially set up or when a component is replaced, there is a significant chance that the complex system 406 will be connected together incorrectly. Incorrectly connected cables 402 are typically not easily identified and may lead to a crisis or failure at some future point in time. Furthermore, trying to diagnose and remedy incorrectly connected cables 402 may consume a significant amount of time and resources and therefore result in significant costs.

Figure 5:
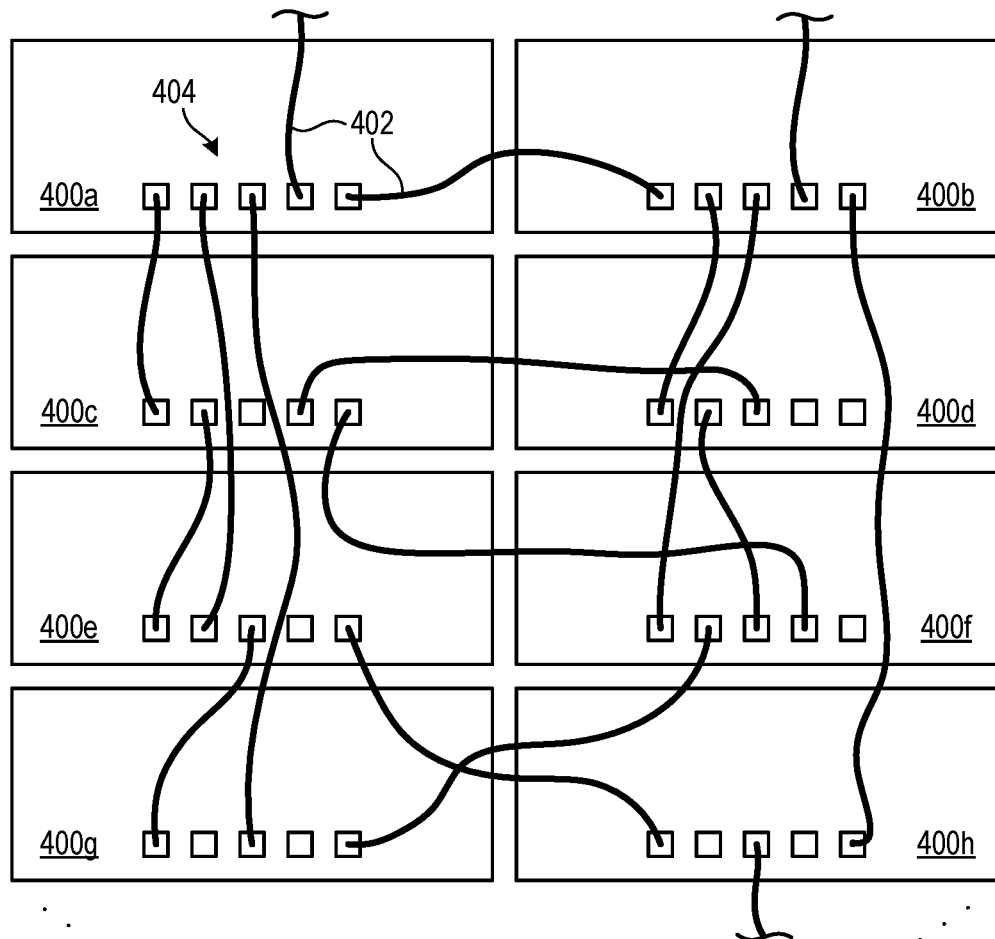
FIG. 5 is a high-level block diagram showing a handheld device used to capture a visual image of the components, cables, and ports.
Figure 5:
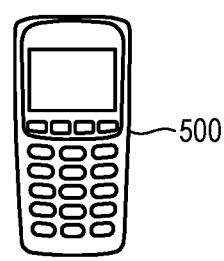

Referring to FIG. 5, in certain embodiments, an apparatus and method may be provided to ensure that components 400 in a complex system 406 are correctly connected together. Such an apparatus and method will ideally significantly reduce human error when connecting the components 400 together.

In certain embodiments, an apparatus 500, such as a handheld device 500, may be provided to ensure that components 400 in a system 406 are correctly connected together. In certain embodiments, once a user connects the components 400 together with cables 402 and ports 404 (during, for example, initial setup of the system 406 or after a repair or replacement of components 400 within the system 406), the apparatus 500 may be configured to capture a visual image of the system 406. In certain embodiments, the apparatus 500 may include a camera and capturing the visual image may be as simple as taking a picture of the system 406 with the apparatus 500 at an angle where the ports 404 and cables 402 are visible.

This visual image may then be analyzed to determine the connection between components 400. For example, artificial intelligence may be used to analyze the visual image and determine one or more of the components 400 that are being utilized, the ports 404 on the components 400 that are being utilized, and the routing of cables 402 between the ports 404. For example, the artificial intelligence may include functionality to identify, within the visual image, cables 402 that are being utilized and trace the routing of these cables 402 from one port 404 to another. The artificial intelligence may be implemented on the apparatus 500 itself and/or on a server that is remote from or external to the apparatus 500 and which communicates with and exchanges information with the apparatus 500. For the purposes of this disclosure, the apparatus 500 may, in certain embodiments, be deemed to include the apparatus 500 itself and any remote or external functionality that is utilized by the apparatus 500.

Once the connections between the components 400 are determined, the apparatus 500 may generate a model that represents the components 400 and the connections therebetween. This model may be presented in any suitable format, including a block diagram or other structured representation. Among other information, the model may identify the components 400 that are being utilized, which ports 404 of the components 400 are being utilized, the types of ports 404 that are being utilized, and the cables 402 and connectivity between the ports 404.

Once the model is generated, the apparatus 500 may compare the model to a previous model to determine if any connections are incorrect or potentially incorrect. In essence, the apparatus 500 validates the current model against a previous model. The previous model may be a former good configuration of the system 406, or potentially a default or ideal system 406. For example, the previous model may be generated from an image captured of the system 406 prior to making any repairs and/or replacements. Alternatively, the previous model may be retrieved from a local or centralized repository. Such a repository may contain, for example, models of systems that are known to have good or efficient configurations and therefore provide a basis from which to compare or validate the system 406.

If any differences between the current model and the previous model are identified, this may indicate that the components 400 have been connected together incorrectly. In certain embodiments, the apparatus 500 may be configured to notify a user in the event any differences are found as well as identify what the differences are. In certain embodiments, the apparatus 500 may suggest how to correct connections and/or suggest alternate connections that may improve or optimize the connectivity of the system 406.

Figure 6:
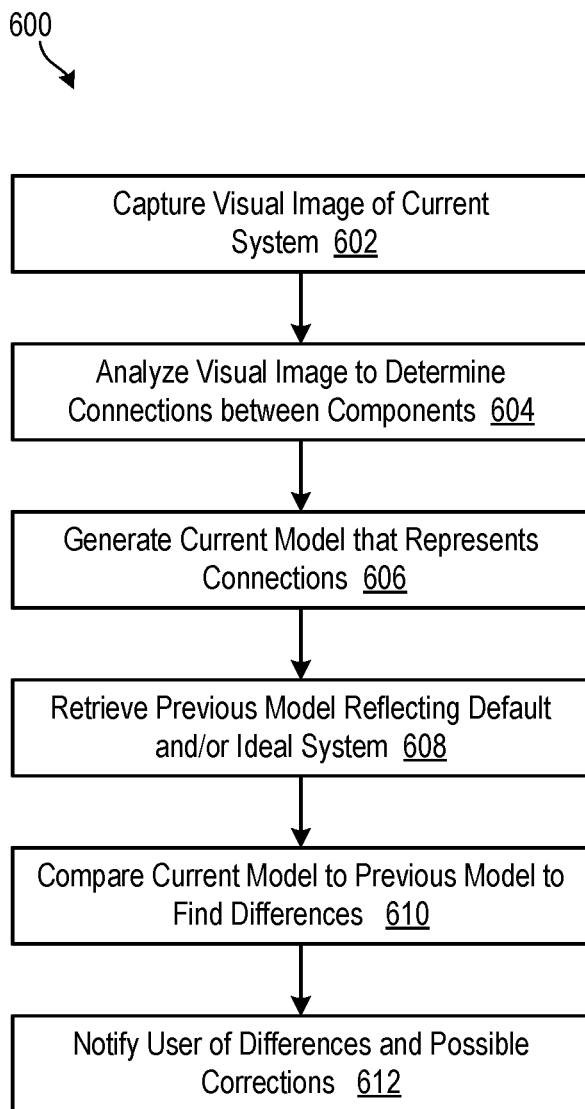
FIG. 6 is a flow diagram showing a first exemplary method for ensuring that components in a complex system are correctly connected together.

Referring to FIG. 6, one embodiment of a method 600 for ensuring that components 400 in a complex system 406 are correctly connected together is illustrated. In certain embodiments, this method 600 is executed by the apparatus 500 previously discussed. In the illustrated embodiment, the method 600 initially captures 602 a visual image of a current system 406. In certain embodiments, this current system 406 is one that has just been set up. The method 600 then analyzes 604 the visual image to determine the connections between components 400. This analysis may include identifying the components 400 themselves (e.g., types, functions, model numbers of the components 400), identifying the ports 404 that are utilized on the components 400, identifying the cables 402 that are utilized between the components 400, and/or identifying the routing of the cables 402 between the ports 404 of the components 400.

The method 600 then generates 606 a current model that reflects the current connectivity state of the system 406. The method 600 also retrieves 608 a previous model that reflects a default or ideal system. This default or ideal system may reflect a default or ideal connectivity between components 400 in the system. In certain embodiments, the default or ideal system may be determined by evaluating one or more models or configurations (either of existing or proposed systems) added to a central repository and using that information along with machine learning to determine an optimized configuration for the system. The method 600 compares 610 the current model to the previous model to determine if any differences exist. If differences do exist, this may indicate the presence of incorrect or non-optimal connections in the current system 406. The method 600 may then notify 612 a user of these differences and/or provide 612 suggestions to correct the connections.

Figure 7:
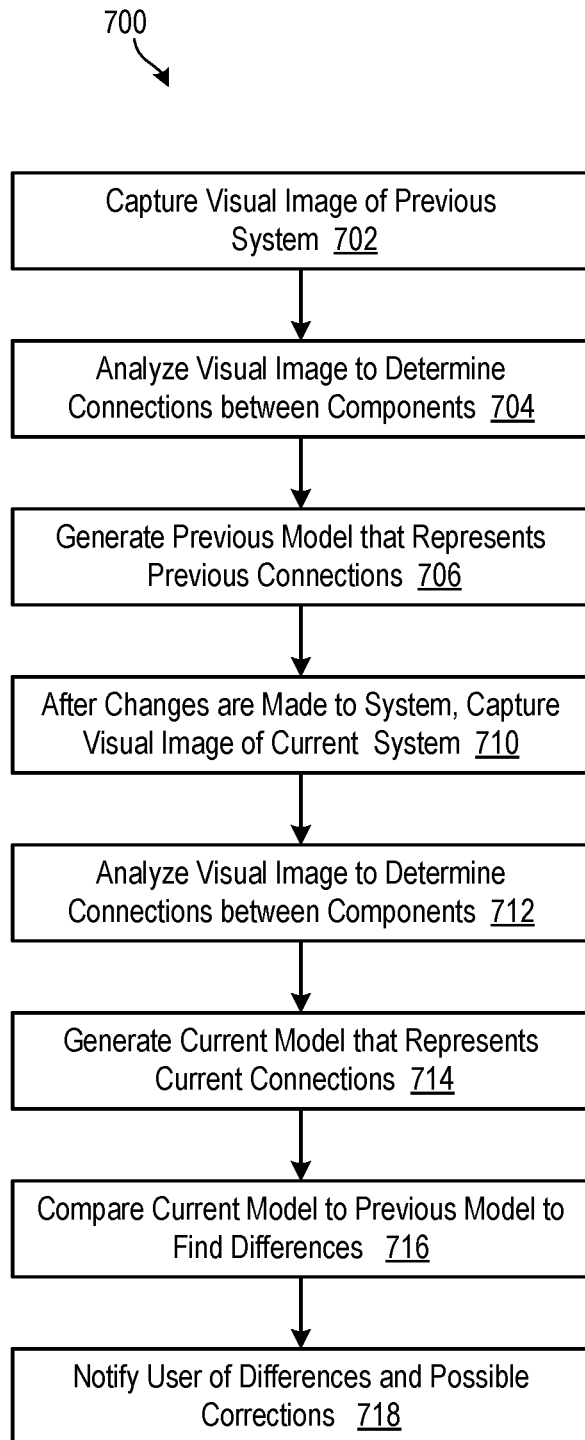
FIG. 7 is a flow diagram showing a second exemplary method for ensuring that components in a complex system are correctly connected together.

Referring to FIG. 7, another embodiment of a method 700 for ensuring that components 400 in a complex system 406 are correctly connected together is illustrated. In certain embodiments, this method 700 is executed by the apparatus 500 previously discussed In this embodiment, the method 700 captures 702 a visual image of a previous system 406 (i.e., a system 406 before repairs and/or changes are made). The method 700 then analyzes 704 the visual image to determine the connectivity between components 400 prior to the repairs and/or changes. The method 700 generates 706 a previous model that represents the connections between components 400 of the previous system 406.

After changes (i.e., repairs and/or replacements) have been made to the system 406, the method 700 captures 710 a visual image of the current system 406. The method 700 analyzes 712 the visual image to determine the connectivity between components 400. The method 700 then generates 714 a current model that represents the connectivity of the system 406 after the changes have been made.

At this point, the method 700 compares 716 the current model to the previous model to determine if any differences exist. In essence, this step 716 validates the current model against the previous model to determine if the current system 406 is connected in the same manner as the previous system 406. If not, the method 700 notifies 718 a user of the differences and/or possible corrections to be made to bring the connectivity of the current system 406 into conformity with the connectivity of the previous system 406.

Figure 8:
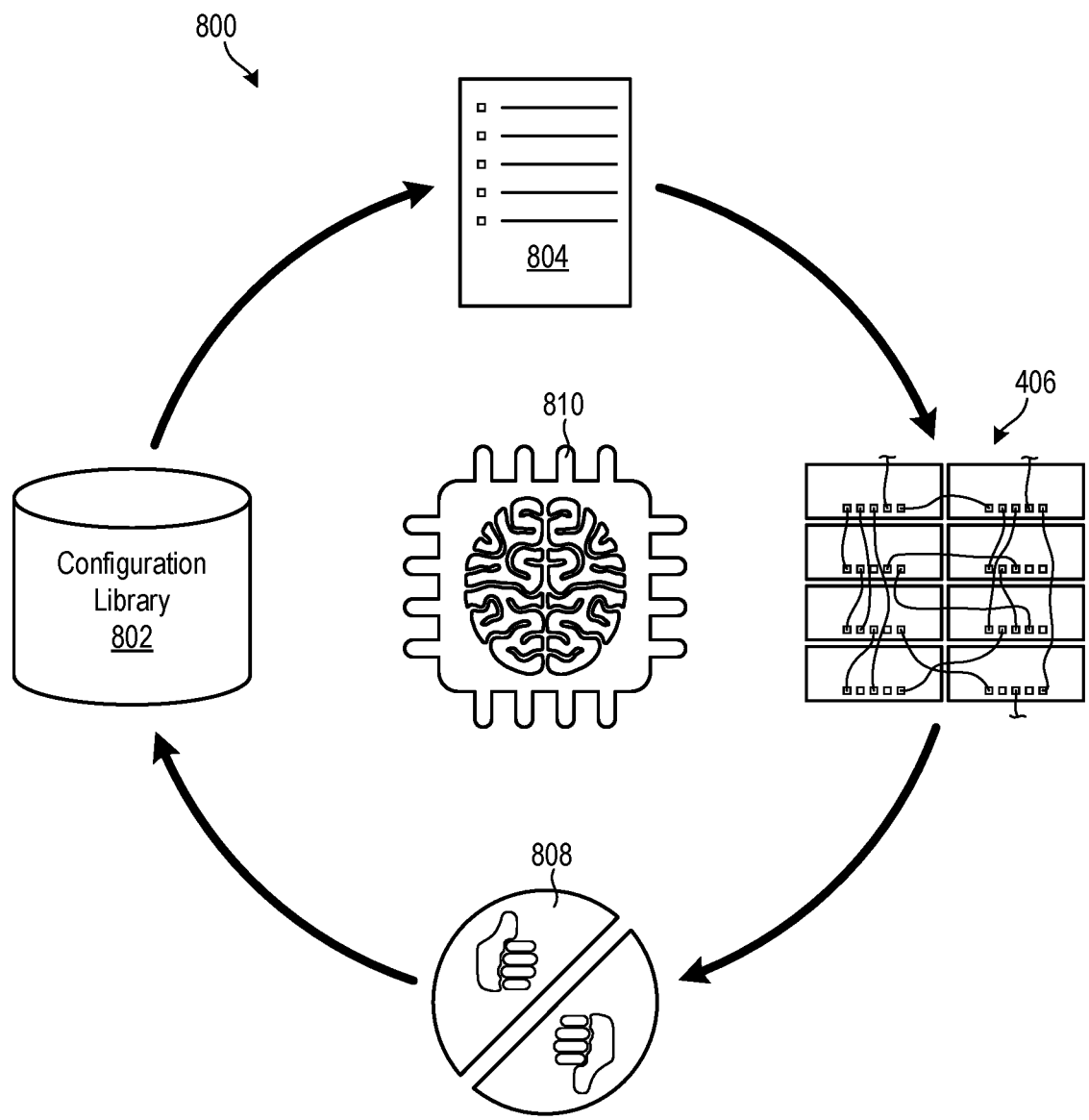
FIG. 8 is a flow diagram showing use of machine learning to continually refine a set of instructions used to connect and cable a complex system.

Referring to FIG. 8, a flow diagram is illustrated showing use of machine learning to continually refine a set of instructions used to connect and cable a complex system. As components 400 in a complex system 406 are successfully cabled together, a configuration associated with the complex system 406 may be saved in a configuration library 802. For the purposes of this disclosure, the term "configuration" may be used to refer to a set of components that are used in a complex system 406, as well as a set of cables that are used to connect the components together, as well as information regarding the interconnections and/or routing of cables between the components, including in some cases the specific ports of the components to which the cables are connected. A "configuration" may provide a model for correctly assembling a complex system 406 of a same or similar type in the future. In some cases, multiple different good configurations of the same complex system 406 are possible, each of which may be saved in the configuration library 802.

In certain embodiments, an apparatus 500, such as the handheld device 500 previously described, may be used to capture a visual image of a complex system 406 that is known to be configured correctly. This visual image may then be analyzed to determine the configuration of the system 406 so that the configuration can be saved in the configuration library 802. For example, an artificial intelligence engine 810 may analyze the visual image to determine the components 400 that are being utilized in the complex system 406. This may be accomplished by recognizing physical characteristics (e.g., size, number of ports, types of ports, etc.) of the components 400, identifiers (e.g., bar codes, model numbers, serial numbers, etc.) of the components 400, or the like. The artificial intelligence engine 810 may also recognize ports 404 on the components 400 that are being utilized, as well as the routing of cables 402 between the ports 404. In certain embodiments, the artificial intelligence engine 810 may also be equipped to identify the types (e.g., Fibre Channel, ethernet, Serial Attached SCSI (SAS), mini SAS, etc.) of cables 402 that are being utilized in the complex system 406. The artificial intelligence engine 810 may be implemented on the apparatus 500 itself and/or on a server or servers that are remote from or external to the apparatus 500 and which communicate or exchange information with the apparatus 500.

Using the configurations stored in the configuration library 802, the artificial intelligence engine 810 may generate a set of instructions 804 for assembling (i.e., cabling) complex systems 406 of a same or similar type. These instructions 804 may take on various forms, including written instructions 804 and/or visual diagrams or schematics. Using, these instructions 804, a technician may assemble a complex system 406. While assembling the complex system 406, the artificial intelligence engine 810 may receive various types of feedback 808 from the technician and/or the apparatus 500 regarding the efficacy and/or accuracy of the instructions 804. For example, as will be discussed in more detail in association with FIG. 10, as steps of the instructions 804 are performed, the artificial intelligence engine 810 may determine whether the steps are performed successfully, are overly complex, are impacted by previous steps, or may be varied to accomplish the same or a similar result. Using this information, the artificial intelligence engine 810 may refine the instructions 804 and/or input new configurations into the configuration library 802. The artificial intelligence engine 810 may repeatedly perform this process to further refine the instructions 804 and/or expand the size of the configuration library 802.

Figure 9:
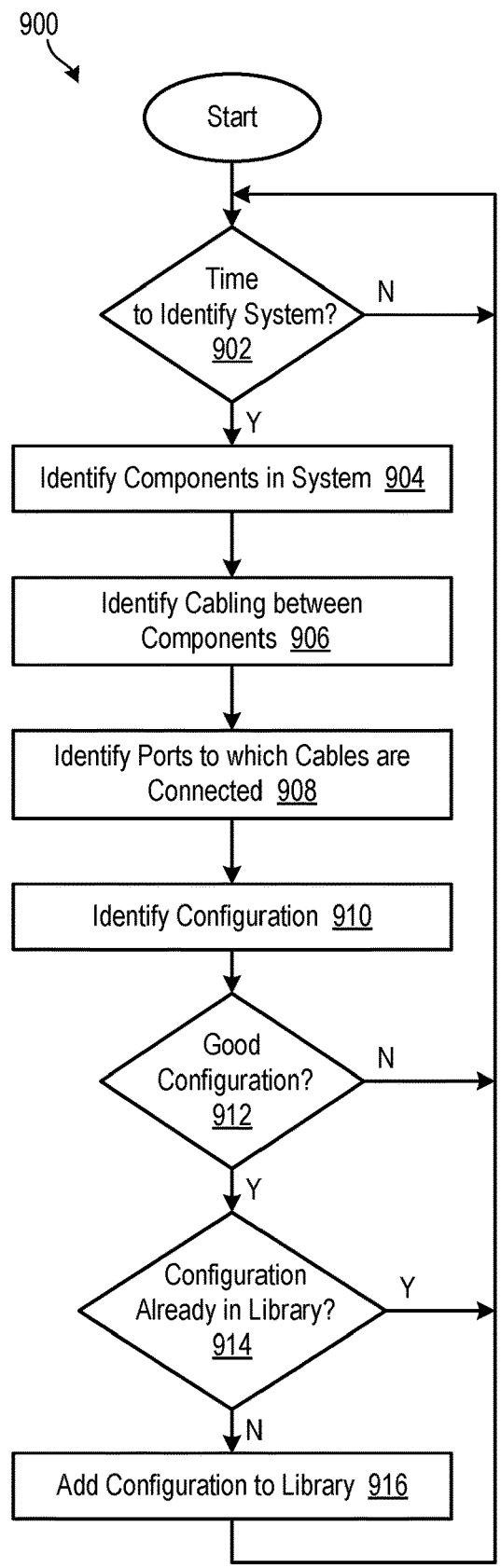
FIG. 9 is a flow diagram showing one embodiment of a method for adding configurations of a complex system to a configuration library.

Referring to FIG. 9, one embodiment of a method 900 to expand (i.e., add configurations to) the configuration library 802 is illustrated. In certain embodiments, this method 900 is performed by the artificial intelligence engine 810, which may be implemented on the apparatus 500 and/or on a server that is remote from or external to the apparatus 500. As shown, the method 900 initially determines 902 whether it is time to identify a complex system 406 either from a visual image and/or manual input from a user. If so, the method 900 identifies 904, from a known set, components 400 of the complex system 406. As previously mentioned, this may be accomplished by recognizing physical characteristics (e.g., size, number of ports, types of ports, etc.) of the components 400, identifiers (e.g., bar codes, model numbers, serial numbers, etc.) of the components 400, and/or the like. The method 900 also identifies 906 cabling between the components 400. For example, the method 900 may identify, within a visual image, cables 402 that are being utilized and trace the routing of these cables 402 from one port 404 to another. The method 900 may also identify 908 ports 404 on the components 400 to which the cables 402 are connected.

Using the information gathered at steps 904, 906, 908, the method 900 may identify the configuration of the complex system 406. The method 900 then determines 912 whether the configuration is a good configuration, meaning that the complex system 406 is functioning correctly in the given configuration. If not, the method 900 ends. If the configuration is a good configuration, the method 900 determines 914 whether the configuration is already in the configuration library 802. In certain embodiments, this may be accomplished by comparing the current configuration to configurations already stored in the configuration library 802. If not, the method 900 adds 916 the configuration to the configuration library 802. If the configuration is already in the configuration library 802, the method 900 ends without adding the configuration to the configuration library 802.

Figure 10:
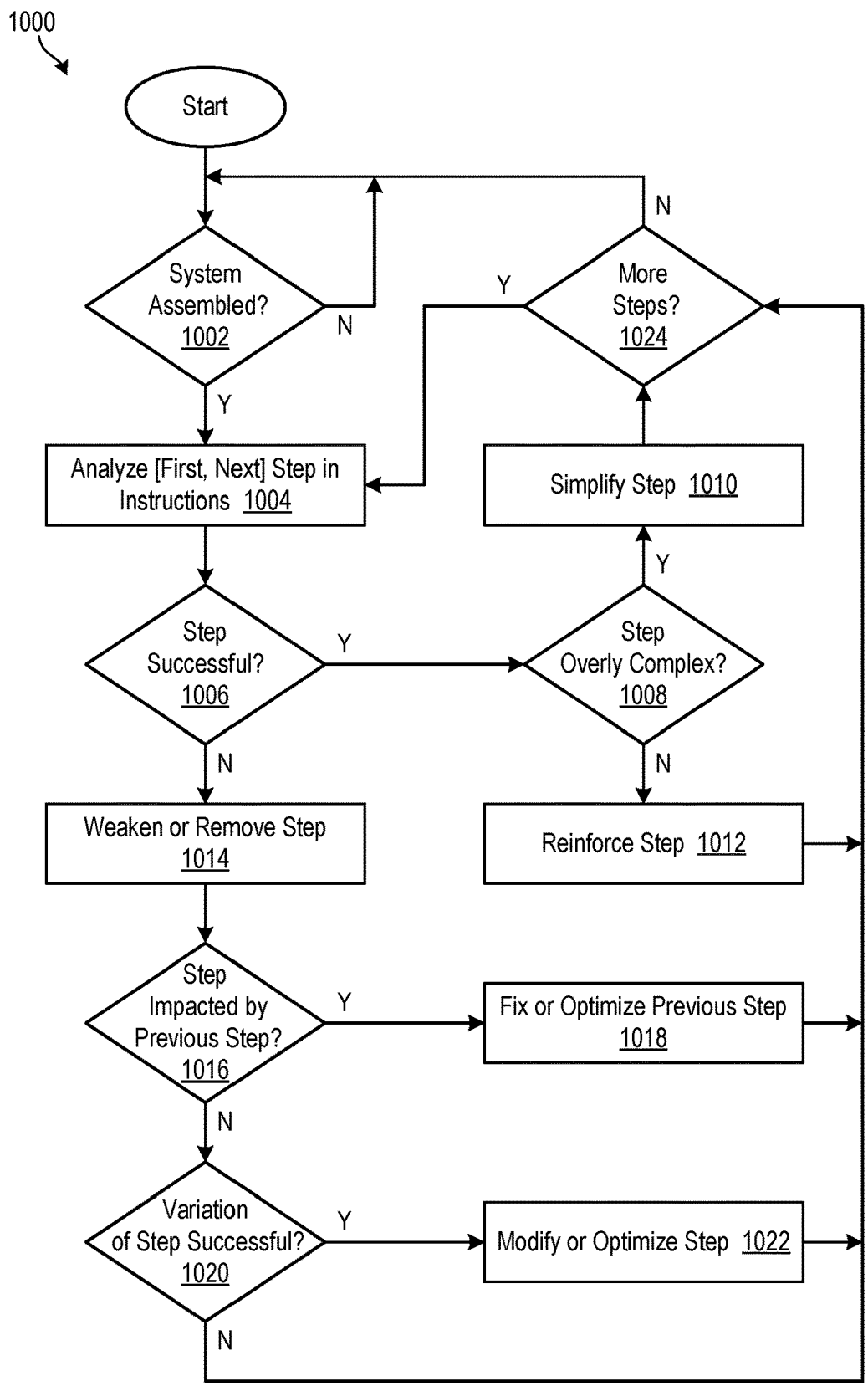
FIG. 10 is a flow diagram showing one embodiment of a method for refining a set of instructions used to connect and cable a complex system.

Referring to FIG. 10, one embodiment of a method 1000 for generating feedback 808 for the artificial intelligence engine 810 is illustrated. Such a method 1000 may be used to refine a set of instructions 804 used to assemble a complex system 406. The feedback generated by the method 1000 may be provided by a user (such as by manually inputting information into the apparatus 500 or responding to prompts from the apparatus 500), observed by the apparatus 500 itself such as by recording performance of the instructions 804 with videos or images, or the like. As shown, the method 1000 initially determines 1002 if a complex system 406 has been assembled or is in the process of being assembled using a set of instructions 804. If so, the method 1000 analyzes 1004 the first step in the instructions 804. If, at step 1006, the step was completed successfully, the method 1000 determines 1008 whether the step was overly complex (this may be determined by receiving feedback 808 from a user, for example). If the step was overly complex, the method 1000 simplifies 1010 the step if possible. For example, the method 1000 may simplify 1010 the step based on feedback 808 received from a user. If the step was not overly complex, the method 1000 reinforces 1012 the step (i.e., strengthens the step as being effective and accurate in assembling the complex system 406).

If, at step 1006, the step was not successful, the method 1000 weakens or removes the step from the instructions 804 (e.g., identifies the step as being ineffective or inaccurate in assembling the complex system 406). The method 1000 then determines 1016 whether the step that was unsuccessful was impacted by a previous step in the instructions 804 (i.e., the step was not successful due to a previous step). If the step was not successful due to a previous step (e.g., cabling instructions of a previous step caused ports to be inaccessible or cables to be too short to execute a subsequent step), the method 1000 fixes 1018 or optimizes 1018 the previous step so that the subsequent step is more likely to be successful.

If a step was not successful but a variation of the step is determined 1020 to be successful, the method 1000 modifies 1022 or optimizes 1022 the step so that it will be successful in the future. In certain embodiments, this may include removing the step completely if a satisfactory result can be achieved without performing the step. The method 1000 may then be repeated for each step in the instructions 804 until the last step is reached 1024. In this way, the method 1000 may refine a set of instructions 804 so that the instructions 804 will be more effective in association with assembling a complex system 406 in the future.

The systems and methods disclosed in FIGS. 8 through 10 disclose an artificial intelligence engine 810 that uses machine learning to refine a set of instructions 804 for assembling a complex system 406. The systems and methods disclosed in FIGS. 8 through 10 are provided by way of example and not limitation. Different variations are possible and within the scope of the invention.

For example, in certain embodiments, the artificial intelligence engine 810 may, for each step in a set of instructions 804, provide various options that may be tried to successfully complete the step. In certain embodiments, these options are ordered in accordance with their probability of success. For example, the option with the greatest chance of success may be listed first, the option with the second greatest chance of success may be listed second, and so forth. In other embodiments, the options may be listed according to the amount of time it takes to complete the options. For example, the fastest option may be listed first, the second fastest option may be listed second, and so forth. Thus, in certain embodiments, a step may be provided with multiple options that may be tried to accomplish the step. In certain embodiments, statistics regarding the success of various steps or options may be gathered in the aggregate, rather than at a personal level, so that no personally identifiable information is linked to particular users.

The flowcharts and/or block diagrams in the Figures illustrate the architecture, functionality, and operation of possible implementations of systems, methods, and computer-usable media according to various embodiments of the present invention. In this regard, each block in the flowcharts or block diagrams may represent a module, segment, or portion of code, which comprises one or more executable instructions for implementing the specified logical function (s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method to ensure that components in a complex system are correctly connected together, the method comprising:
    generating, using artificial intelligence, a library of previous configurations of a system, the system comprising a plurality of components connected together with cables;
    generating, from the library, instructions for assembling the system by connecting components of the system together with cables;
    receiving feedback generated in the course of using the instructions to assemble the system; and
    using the feedback to refine the instructions.

2. The method of claim 1, further comprising validating the assembled system against the previous configurations of the system.

3. The method of claim 2, further comprising generating alerts in response to detecting differences between the assembled system and the previous configurations of the system.

4. The method of claim 1, wherein the instructions comprise at least one of written instructions and visual diagrams.

5. The method of claim 1, wherein receiving feedback comprises receiving feedback regarding connection step success when executing the instructions.

6. The method of claim 1, wherein receiving feedback comprises receiving feedback regarding connection step complexity when executing the instructions.

7. The method of claim 1, wherein receiving feedback comprises receiving at least one of (1) feedback regarding connection step variation when executing the instructions; and (2) feedback regarding subsequent step impact when executing the instructions.

8. A computer program product to ensure that components in a complex system are correctly connected together, the computer program product comprising a computer-readable medium having computer-usable program code embodied therein, the computer-usable program code configured to perform the following when executed by at least one processor:
    generate, using artificial intelligence, a library of previous configurations of a system, the system comprising a plurality of components connected together with cables;
    generate, from the library, instructions for assembling the system by connecting components of the system together with cables;
    receive feedback generated in the course of using the instructions to assemble the system; and
    use the feedback to refine the instructions.

9. The computer program product of claim 8, wherein the computer-usable program code is further configured to validate the assembled system against the previous configurations of the system.

10. The computer program product of claim 9, wherein the computer-usable program code is further configured to generate alerts in response to detecting differences between the assembled system and the previous configurations of the system.

11. The computer program product of claim 8, wherein the instructions comprise at least one of written instructions and visual diagrams.

12. The computer program product of claim 8, wherein receiving feedback comprises receiving feedback regarding connection step success when executing the instructions.

13. The computer program product of claim 8, wherein receiving feedback comprises receiving feedback regarding connection step complexity when executing the instructions.

14. The computer program product of claim 8, wherein receiving feedback comprises receiving at least one of (1) feedback regarding connection step variation when executing the instructions; and (2) feedback regarding subsequent step impact when executing the instructions.

15. An apparatus to ensure that components in a complex system are correctly connected together, the apparatus comprising:
    at least one processor;
    at least one memory device coupled to the at least one processor and storing instructions for execution on the at least one processor, the instructions causing the at least one processor to:
        generate, using artificial intelligence, a library of previous configurations of a system, the system comprising a plurality of components connected together with cables;
        generate, from the library, instructions for assembling the system by connecting components of the system together with cables;

receive feedback generated in the course of using the instructions to assemble the system; and use the feedback to refine the instructions.

16. The apparatus of claim 15, wherein the instructions further cause the at least one processor to validate the assembled system against the previous configurations of the system.

17. The apparatus of claim 16, wherein the instructions further cause the at least one processor to generate alerts in response to detecting differences between the assembled system and the previous configurations of the system.

18. The apparatus of claim 15, wherein the instructions comprise at least one of written instructions and visual diagrams.

19. The apparatus of claim 15, wherein receiving feedback comprises receiving at least one of (1) feedback regarding connection step success when executing the instructions; and (2) feedback regarding connection step complexity when executing the instructions.

20. The apparatus of claim 15, wherein receiving feedback comprises receiving at least one of (1) feedback regarding connection step variation when executing the instructions; and (2) feedback regarding subsequent step impact when executing the instructions.

* * * * *